US010860380B1

(12) United States Patent
Kowalski et al.

(10) Patent No.: US 10,860,380 B1
(45) Date of Patent: Dec. 8, 2020

(54) PERIPHERAL DEVICE FOR ACCELERATING VIRTUAL COMPUTING RESOURCE DEPLOYMENT

(71) Applicant: Amazon Technologies, Inc., Seattle, WA (US)

(72) Inventors: Marcin Piotr Kowalski, Cape Town (ZA); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 16/147,460

(22) Filed: Sep. 28, 2018

(51) Int. Cl.
*G06F 9/455* (2018.01)
*G06F 9/50* (2006.01)
*G06F 13/10* (2006.01)

(52) U.S. Cl.
CPC .......... *G06F 9/5027* (2013.01); *G06F 13/10* (2013.01)

(58) Field of Classification Search
None
See application file for complete search history.

*Primary Examiner* — Gregory A Kessler
(74) *Attorney, Agent, or Firm* — Robert C. Kowert; Kowert, Hood, Munyon, Rankin & Goetzel, P.C.

(57) ABSTRACT

A peripheral device may accelerates deployment of a virtual computing resource at a resource host. Storage locations in a memory of a host may be identified for an image of a virtual computing resource to be implemented at the host. The image data may be prepared to be hosted by the peripheral device. The peripheral device may store the prepared image in the storage locations via a direct memory access channel between the peripheral device and the host memory instead of writing the prepared image via a processor of the host system.

20 Claims, 8 Drawing Sheets

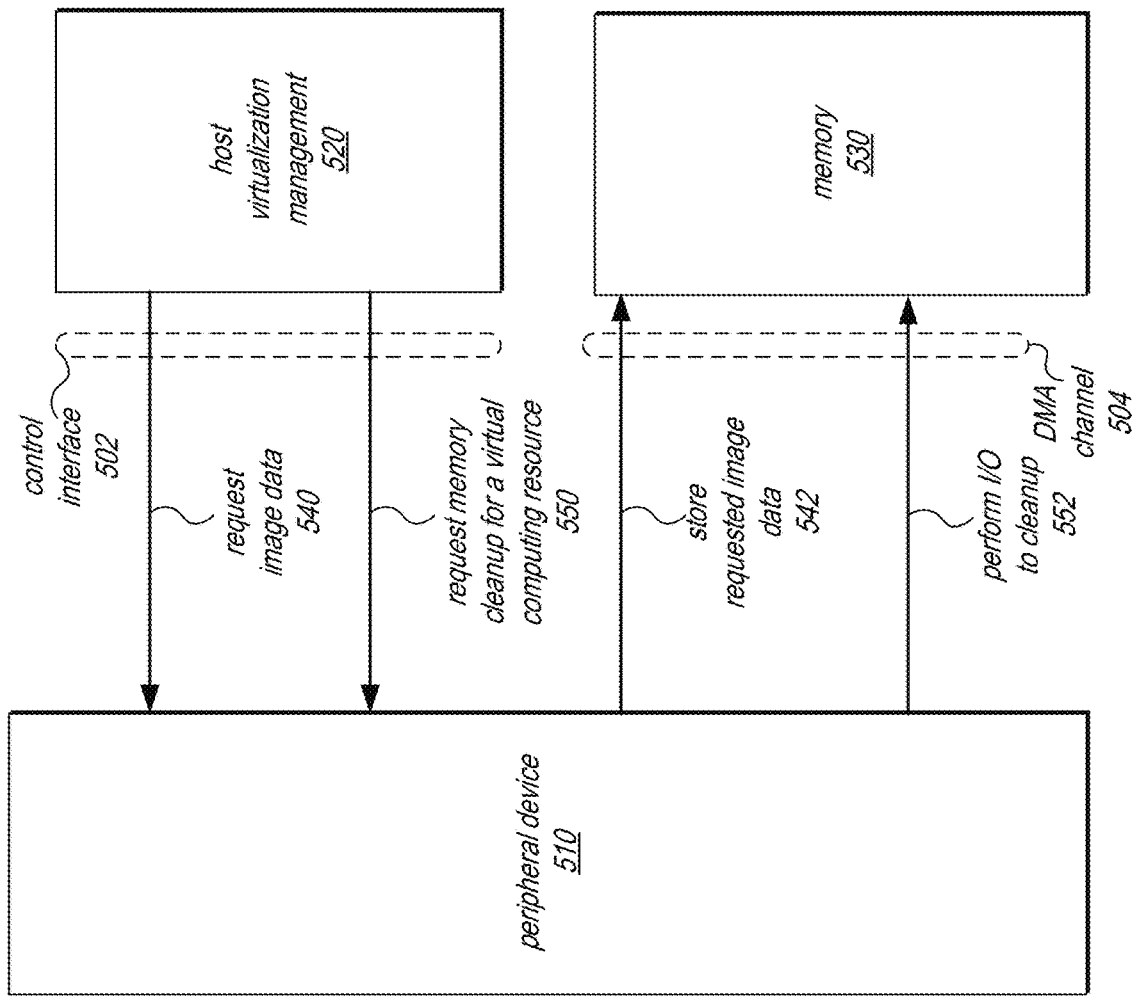

PERIPHERAL DEVICE FOR ACCELERATING VIRTUAL COMPUTING RESOURCE DEPLOYMENT

BACKGROUND

The demand for computing services continues to drive development to increase the capabilities of hardware resources to accommodate the demand. However replacing entire sets of hardware resources in order to acquire the latest technological capabilities (e.g., replacing entire servers or racks of servers) can be very costly. Peripheral devices provide a cost effect way to expand the capabilities of fixed computing resources. For instance, without peripheral devices, a server would be limited to the built in capabilities on the server motherboard (e.g., built-in memory, processors, and other computing resources). By installing peripheral devices in expansion interfaces (e.g., PCI or PCIe slots), the capability of the server may be increased. A graphics card, network interface card, additional memory, or device controllers or interfaces for storage, for example, may be added to enhance the functionality of the server. Moreover, newer peripheral devices with greater performance capabilities may be more cost effective to install and replace existing peripheral devices. Thus, peripheral devices can help satisfy computing service demand by providing cost effective upgrades to existing hardware resources.

BRIEF DESCRIPTION OF THE DRAWINGS

FIG. 5 illustrates interactions between a peripheral device and a virtualization manager of a resource host to manage memory for virtual computing resources, according to some embodiments.

Figure 1:
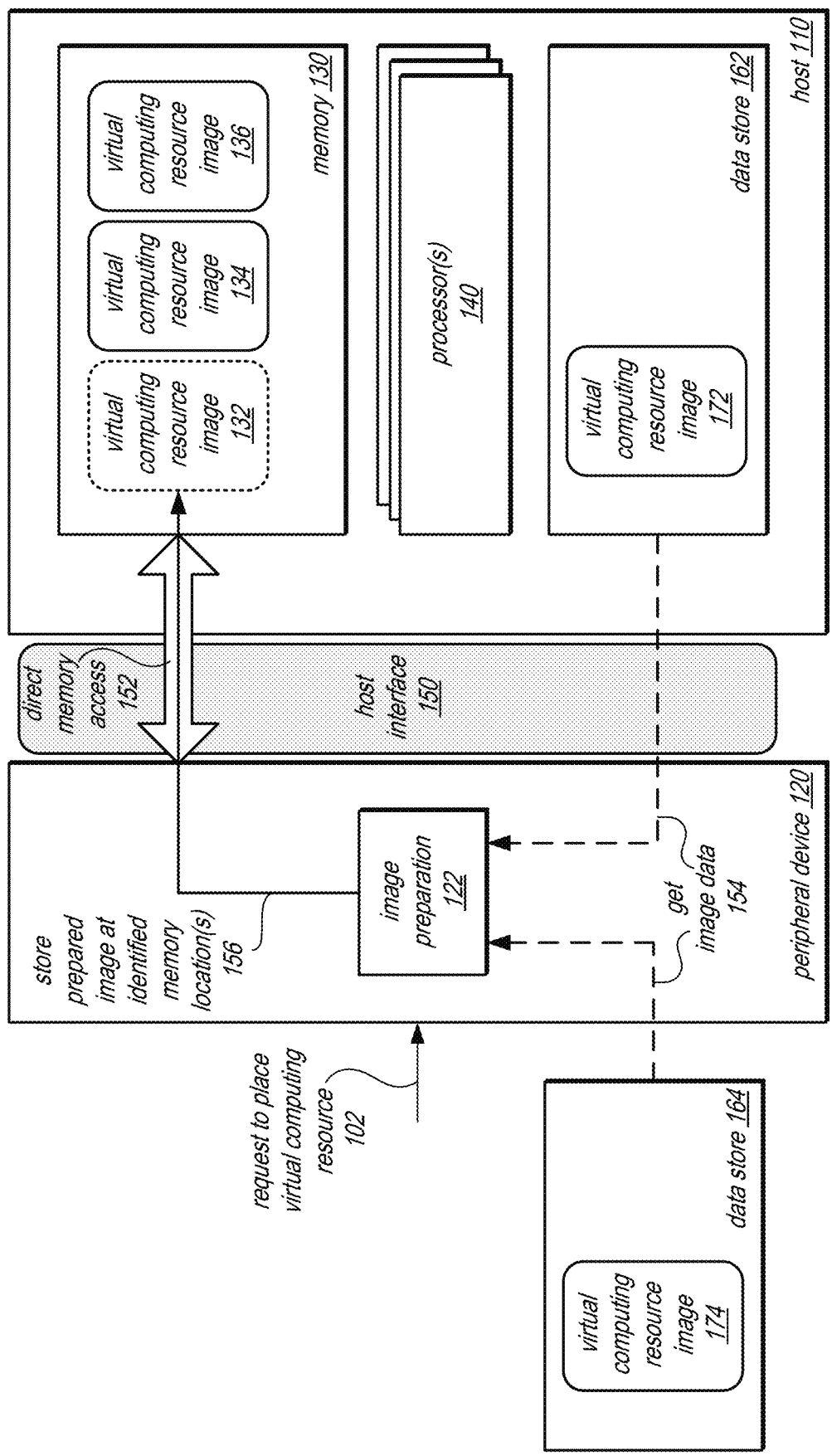
FIG. 1 is a logical block diagram illustrating a peripheral device that accelerates deployment of a virtual computing resource, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a peripheral device for accelerating deployment of a virtual computing resource. Computing resources, such as various kinds of servers, computers, and other computing devices may utilize peripheral devices to expand the capabilities of the computing resources beyond that which the underlying hardware of the computing resources can provide. Thus, additional graphics processing capabilities, network processing capabilities, storage processing capabilities, or other computing capabilities may be changed as result of installing peripheral devices.

Because peripheral devices offer additional capabilities and resources to connected systems, scenarios where resource constraints or limitations may slow the performance of different tasks or operations are ripe for leveraging peripheral devices. One such scenario involves the deployment of virtual computing resources. Virtual computing resources may allow hardware resources, such as a single server, to be shared among multiple users by providing each user with one or more virtual resources (e.g., virtual machines, virtualized operating systems, other applications, etc.) hosted by the hardware resources, with each such virtual computing resource offering a distinct logical computing resource, while also providing application isolation and security among the various virtual computing resources.

To implement such virtual computing resources, various state information (e.g., processor register values, cache information, etc.) and other data (e.g., operating system data, application data, device/driver data, etc.) which may be collectively referred to as an image of the virtual computing resource, may be deployed, written, or otherwise stored to a memory of host hardware in order to implement the virtual computing resource (e.g., by executing applications or other features in the image in the memory at host processor(s)). Because deployment of virtual computing resource images involves placing data into memory, certain costs to deploy virtual computing resources may affect the performance of already hosted virtual computing resources or the time to deploy the virtual computing resources according to the resources involved to store the image data (e.g., by utilizing a processor or other non-optimized host component to retrieve, prepare, and store image data into memory at the host).

In various embodiments, a peripheral device connected to a host system may be used to accelerate deployment of virtual computing resources by performing the deployment of the image for a virtual computing resource using minimal host resources and/or optimized deployment features. In this way, the time and other costs to deploy virtual computing resources may be minimized by minimizing the impact on a host system and may prevent deployment work from affect the performance of other hosted virtual computing resources. FIG. 1 illustrates a logical block diagram illustrating a peripheral device that accelerates deployment of a virtual computing resource, according to some embodiments.

Host 110 may implement various resources, such as processor(s) 140 (e.g., similar to processors 1010 in FIG. 8), memory 130 (e.g., similar to memory 1020 in FIG. 8) and data store 162 (e.g., similar to persistent storage 1060 in FIG. 8) to host one or more virtual computing resources (e.g., virtualized machines, servers, operating systems, containers, or program code that is executed upon a triggering event as discussed below with regard to FIG. 2). Memory 130 may store image data for the virtual computing resources (e.g., including various state, application, operating system, or other data to implement the virtual computing resources), such as virtual computing resource images 134 and 136.

Peripheral device 120 may be connected to host 110 via host interface 150 (e.g., a physical connection through an expansion card slot or other bus for host 110). Peripheral device 120 may accept instructions or requests to place a virtual computing resource 102 at host 110. Peripheral device 120 may get image data 154 from one or more stores, such as virtual computing resource image 172 in data store 162 local to host 110 and/or from virtual computing resource image 174 in data store 164, external to host 110. External data store 164 may be a network attached or accessible data store or may be storage (e.g., flash-based storage) implemented on peripheral device 120, in some embodiments.

In some embodiments, peripheral device 120 may perform various operations to prepare 122 the image to be hosted. For example, as discussed below with regard to FIGS. 3, 4, 6, and 7, image preparation may decompress, decrypt, and modify to change image configuration information in order to ready the image to implement the virtual computing resource. Peripheral device 120 may then store the prepared image at identified memory location(s) 156 in memory 130 (e.g., at locations identified for virtual computing resource image 132) via direct memory access 152. The locations may be identified by the request 102 (e.g., received from host 110 or other management system). In this way, by utilizing direct memory access 152, the image data can be deployed to memory 130 without utilizing processor(s) 140. Moreover, as various image data retrieval, preparation, and storage features can be optimized (e.g., by off-host storage, dedicated hardware, or specialized execution environments), peripheral device 120 can perform deployment faster than host 110 could have done relying upon processor(s) 140.

Please note that previous descriptions are not intended to be limiting, but are merely provided as an example of a peripheral device for accelerating virtual computing resource deployment. Various types of peripheral devices, hosts systems, data stores, host interfaces, processors, and memories may be implemented in addition to or instead of those given in the examples discussed above.

This specification begins with a general description of a provider network, which may implement a peripheral device to accelerate deployment of virtual computing resources, such as virtual compute instances offered via a virtual compute service. Then various examples of a resource host and peripheral device are discussed, including different components/modules, or arrangements of components/module that may be employed as part of virtual computing resource deployment. A number of different methods and techniques to implement a peripheral device to accelerate virtual computing resource deployment are then discussed, some of which are illustrated in accompanying flowcharts. Finally, a description of an example computing system upon which the various hosts, components, modules, systems, devices, and/or nodes may be implemented is provided. Various examples are provided throughout the specification.

Figure 2:
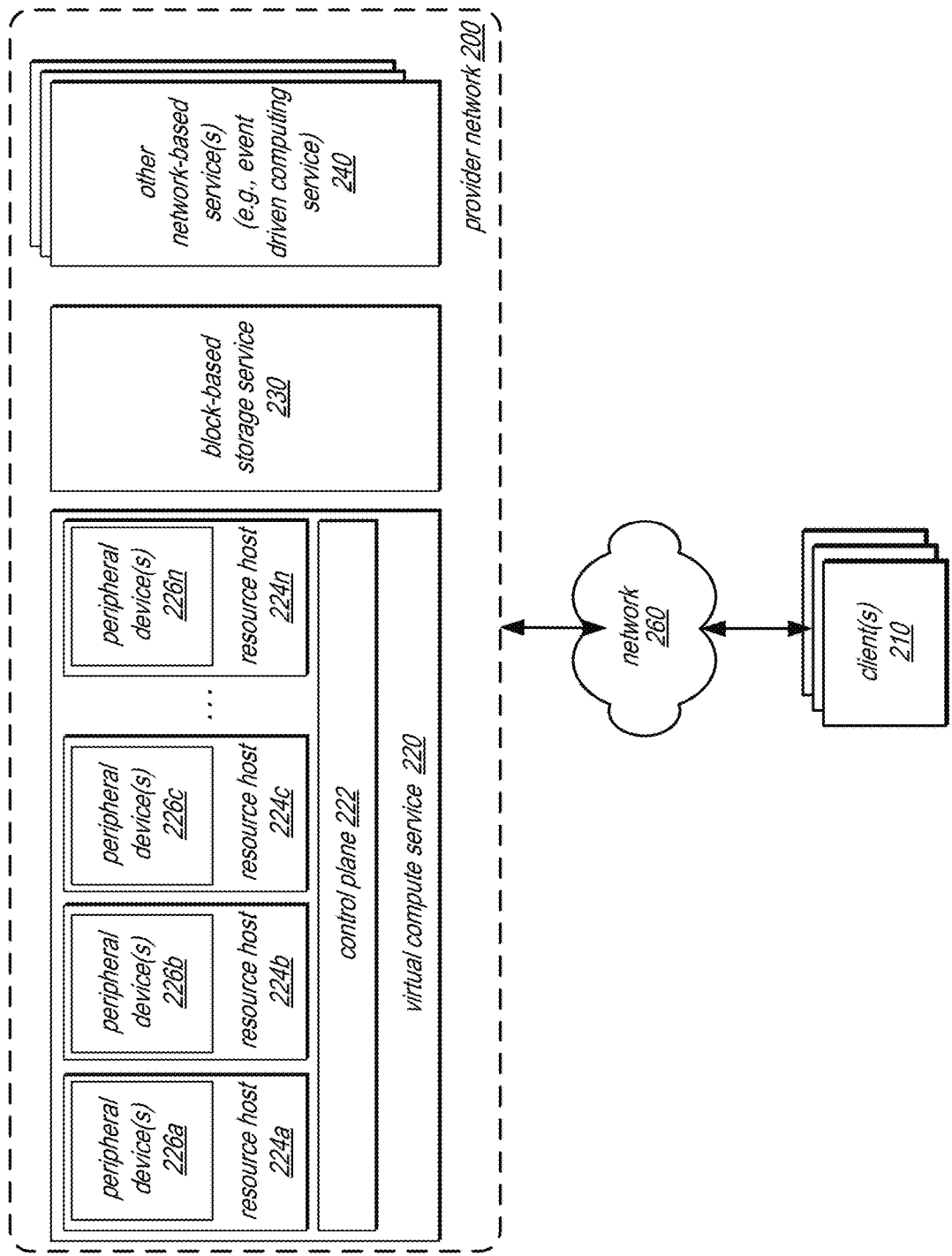
FIG. 2 is a logical block diagram illustrating a provider network implementing multiple network-based services including resource hosts that utilize peripheral devices to accelerate virtual computing resource deployment, according to some embodiments.

FIG. 2 is a block diagram illustrating a provider network implementing multiple network-based services including resource hosts that utilize peripheral devices to accelerate virtual computing resource deployment, according to some embodiments. Provider network 200 may be set up by an entity such as a company or a public sector organization to provide one or more services (such as various types of cloud-based computing or storage) accessible via the Internet and/or other networks to clients 210.

Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 220, storage services, such as block-based storage service 230 and other storage services (which may include various storage types such as object/key-value based data stores or various types of database systems), and/or any other type of network-based services 240. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes hosted by block-based storage service 230, providing virtual block storage for the compute instances.

As noted above, virtual compute service 220 may offer various compute instances to clients 210. Virtual compute service 220 may implement various resource hosts, such as hosts 224a, 224b, 224c, and 224n, (e.g., servers or other computing devices such as described below with regard to FIG. 8) which provide various physical computing resources which virtual compute instances utilize to operate. As illustrated in FIG. 2, one or more peripheral devices(s), such as peripheral devices 226a, 226b, 226c, and 226n, which may be implemented to perform various functions to deploy virtual computing resources as discussed in detail below with regard to FIGS. 3-5. Peripheral device(s) may be connected to resource hosts via an expansion bus or other interface.

Resource hosts may host one or multiple types of virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 220 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by block-based storage service 230 in order to obtain persistent block-based storage for performing various operations (e.g., which may include storing images of compute instances which can be accessed by peripheral device(s) 226 for deployment).

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, provider network 200 may also implement block-based storage service 230 for performing storage operations. Block-based storage service 230 is a storage system, composed of a pool of multiple independent resource hosts similar to resources hosts 224 (e.g., server block data storage systems), which provide block level storage for storing one or more sets of data volumes data volume(s). Data volumes may be mapped to particular clients (e.g., a virtual compute instance of virtual compute service 220), providing virtual block-based storage (e.g., hard disk storage or other persistent storage) as a contiguous set of logical blocks. In some embodiments, a data volume may be divided up into multiple data chunks or partitions (including one or more data blocks) for performing other block storage operations, such as snapshot operations or replication operations.

Provider network 200 may implement various other services 240 that leverage or utilize services like virtual compute service 220. For example, various "serverless" service offerings that allow users to specify operations, tasks, or functions to be performed without the necessity of determining or managing the number of underlying resources (e.g., resource hosts 224) to perform the operations. For example, one such service may be an event driven service, which may maintain a pool of pre-initialized virtual machine instances (or instances of virtual operating system containers) that are ready for use as soon as a request is received to execute a function or other program code, in various embodiments.

The event driven compute service may maintain a pool of virtual machine instances that have one or more software components (e.g., operating systems, language runtimes, libraries, etc.) loaded thereon. The virtual machine instances in the pool may designated to service requests to execute functions or other program codes, in some embodiments. The functions or other program codes can be executed in isolated containers that are created on the virtual machine instances, in some embodiments, or separate physical servers, hosts, or computing devices. Since the virtual machine instances in the pool have already been booted and loaded with particular operating systems and language runtimes by the time the requests are received, a delay associated with finding compute capacity that can handle the requests (e.g., by executing the functions or other program codes in one or more containers created on the virtual machine instances) may be significantly reduced, in some embodiments. Moreover, as discussed above with regard to FIG. 1 and below with regard to FIGS. 3-7, peripheral devices to deploy images of virtual computing resources such as those virtual machine instances that may be used to execute functions or other program codes can be quickly deployed in order to scale resources and maintain a seamless, serverless user experience.

In some embodiments, the event-driven compute service may handle a request to execute functions or other program codes in response to a triggered event, and programmatic information to enable the event driven compute service to convert the event message into a request for further processing by the event driven compute service. The event message and/or programmatic information contained therein may be structured according to a schema, a code model, or an application programming interface ("API"), console, command-line or graphical user interface or any other interface to facilitate both creation/generation of the event message at the auxiliary service and conversion/processing of the event message at the event driven compute service, in some embodiments.

The event driven compute service may perform automatic rate matching and scaling between events being triggered on an auxiliary service and the corresponding execution of functions or other program codes on various virtual machine instances, in some embodiments. Thus, the event driven compute service may be capable of responding to events on-demand, whether the events are triggered infrequently (e.g., once per day) or on a larger scale (e.g., hundreds or thousands per second), in some embodiments, and thus the benefits of peripheral device accelerated deployment of virtual computing resources may be extremely valuable to both clients that utilize an event driven service to obtain optimal scaling and performance, and an operator of provider network that has to efficiently maintain an optimal number of deployed virtual machine instances to service requests.

Functions or program code executed by event driven compute service may be any program code (e.g., a program, routine, subroutine, thread, etc.) written in a program language or programming paradigm (e.g., automatically generated code based on user-specified steps, operations, or other representations of functionality), in some embodiments. Such functions or other program codes may be executed to achieve a specific task, in some embodiments—such as in connection with an event generated by a particular web application or mobile application developed by a user that submitted the function or other program code or a function. For example, the functions or other program codes may be written in JavaScript (node.js), Java, Python, and/or Ruby. The request and/or corresponding event message may include an identifier of the event used to identify the function (and location thereof), and one or more arguments/parameters to be used for executing the function or program code, in one embodiment. For example, the user may provide the function or other program code along with the request to execute the function or program code in response to the occurrence of one or more events, in one embodiment. In another example, the request may identify a previously uploaded function or program code by its name or its unique ID and one or more triggering conditions for executing the function, in one embodiment. In yet another example, the function may be included in the request as well as uploaded in a separate location (e.g., a storage service or a storage system internal to event driven compute service) prior to the request is received by the event-driven compute service, in some embodiments. The event-driven compute service may vary its code execution strategy based on where the code is available at the time the request is processed, in some embodiments.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume in a manner that is transparent to applications implement on the client 210 utilizing computational resources provided by the compute instance or block storage provided by the data volume 226. In at least some embodiments, clients may be internal to provider network 200 (e.g., implemented at different services or resources within provider network 200).

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
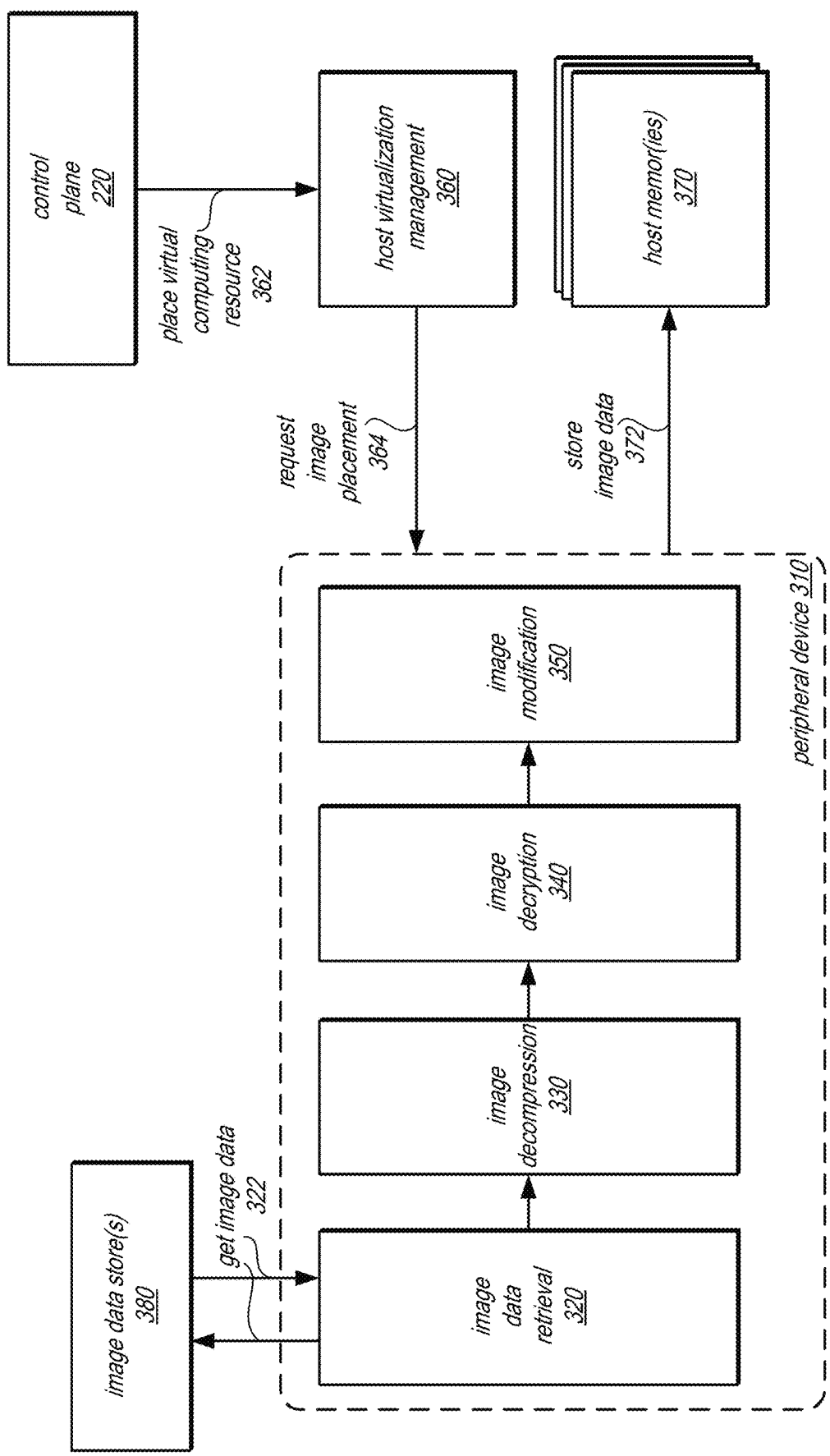
FIG. 3 is a logical block diagram illustrating a peripheral device that implements various features to accelerate virtual computing resource deployment to a host system connected to the peripheral device, according to some embodiments.

FIG. 3 is a logical block diagram illustrating a peripheral device that implements various features to accelerate virtual computing resource deployment to a host system connected to the peripheral device, according to some embodiments. A resource host may host one or more virtual computing resources (which may be virtual compute instances, as discussed above) and may be connected to a peripheral device, such as peripheral device 310. In at least some embodiments of a provider network 200, at least some of the virtual computing resources provided to clients of the provider network 200 may be implemented on multi-tenant hardware that is shared with other client(s) and/or on hardware dedicated to the particular.

Figure 8:
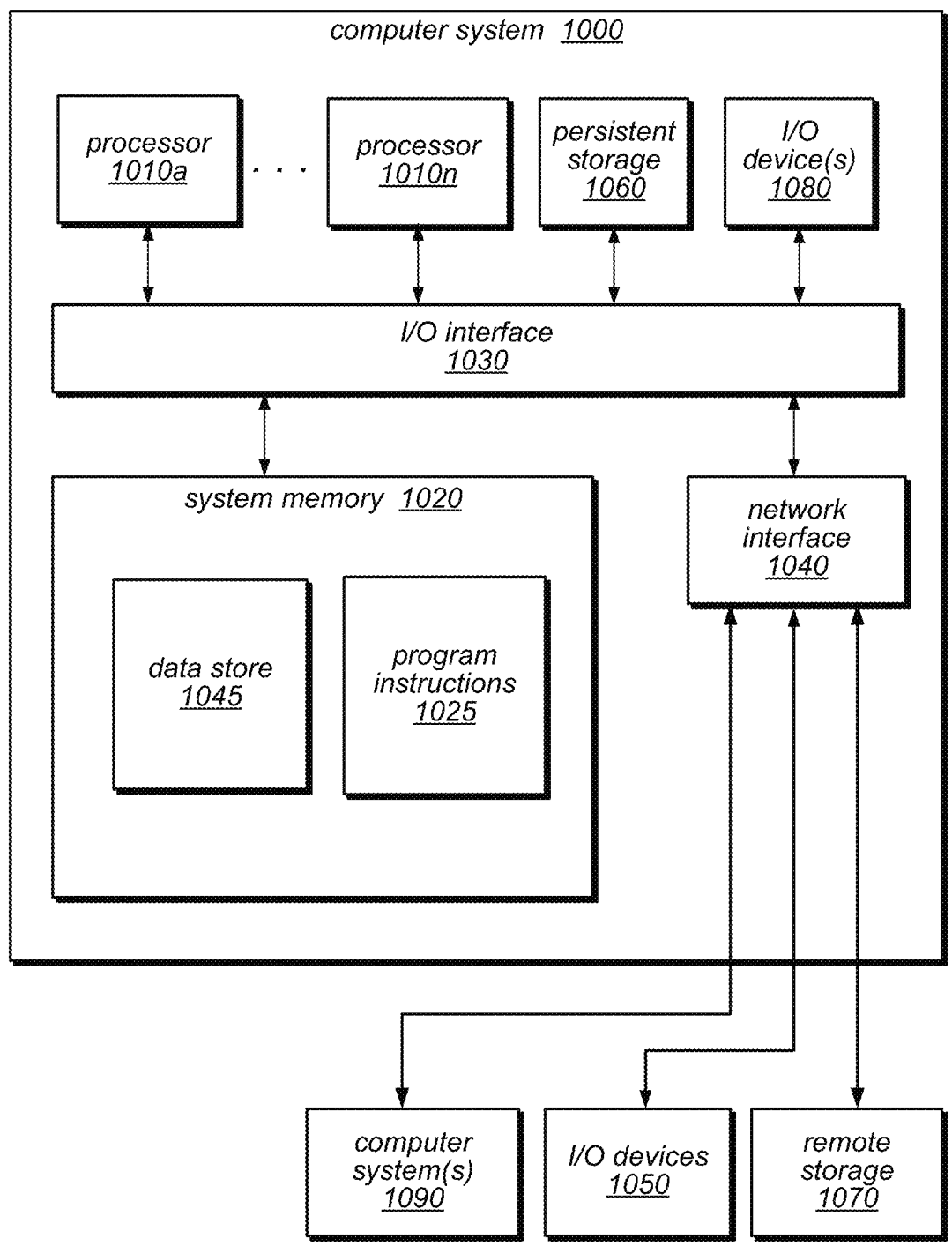
FIG. 8 is a block diagram illustrating an example computing system, according to some embodiments.

At least some of the virtual compute instances on the provider network 200 may be implemented according to hardware virtualization technology that enables multiple operating systems to run concurrently on a host computer, i.e. as virtual machines (VMs) on the host. A hypervisor, virtual machine monitor (VMM), or other host virtualization management feature 360, on the host may present the virtual compute instances on the respective host with a virtual platform and monitor the execution of the virtual compute instances on the host. Each virtual compute instance may be provided with one or more network addresses, in some embodiments. Host virtualization management 360 and virtual compute instances may be implemented on and executed by host hardware resources, for example processor(s) and memory implemented by the host. FIG. 8 is a block diagram illustrating an example computer system that may be used as a host in some embodiments.

In at least some embodiments, a host may include or may be coupled to one or more peripheral device(s), such as peripheral device 310 that perform various tasks or operations, including operations to deploy images for virtual compute instances. Peripheral device 310 may connect to and communicate with a host according to host I/O interface (which may be any kind of expansion bus standard, such as peripheral component interconnect (PCI), PCI extended (PCI-X), PCI express (PCIe), or accelerated graphics port (AGP). For example, peripheral device 310 may be a card with a PCIe interface plugged into a PCIe expansion slot or PCIe bus of the host.

Placement of virtual computing resources, such as virtual computing instances (or virtual machine instances for an event driven computing service) may be initiated by a control plane 220, which may implement various management functions, including handling requests or decisions to deploy a virtual computing resource. Control plane 220 may send a request 362 to place a virtual computing resource at a host that implements host virtualization management 360. Host virtualization management 360 may accept the placement and send a request to peripheral device 310 to place an image for the virtual computing resource in host memory 370 (e.g., using an interface discussed below with regard to FIG. 5).

Peripheral device 310 may implement image data retrieval 320, in some embodiments. Image data retrieval 320 may be able to communicate with various image data store(s) 380 in order to achieve image data. For example, peripheral device 310 may have a network connection (e.g., separate from a host system) that can submit network requests to a network-based data store, such as block-based storage service 230 in FIG. 2, to retrieve some or all of an image data. In some embodiments, a combination of image data stores 380 may be used to provide the image to stored (e.g., some data from a block-based data storage volume in block-based storage service, some from local persistent storage at the peripheral device or host (which may be accessed via a host interface) and some from another network storage location, such as a cold data storage system or an object-based storage service). In some embodiments, image data retrieval 320 can perform pre-processing to merge or combine image data from different sources (or such operations may be performed later, such as at image modification 350). As discussed below with regard to FIGS. 4A-4C the image data retrieved may vary on the type of image being stored 372 in host memory 370.

Peripheral device 310 may implement image decompression 330 to apply one or more compression techniques to generate a decompression version of image data. Image decompression 330 may, for instance, apply a lossless compression technique to generate the decompressed data, such as Run-length encoding, Huffman encoding, bzip, or Lempel-Ziv based compression, among other techniques. Similarly, peripheral device 310 may implement image decryption 340 to apply one or more decryption techniques to decrypt image data. Image decryption 340 may apply, for instance, symmetric key or public-private key encryption techniques to generate the decrypted version of image data utilizing credentials, tokens, or other information (e.g., which may be supplied in request 362).

Various other changes to prepare the image data to implement a virtual computing resource may be applied by image modification 350, in some embodiments. For example, changes to configuration or identification information may be applied, like a MAC-address change, host-name change, inject security credentials, among other changes. In at least some embodiments, image modification 350 may overlay or generate spare fill values to modify, rewrite, or replace obtained image data. For example, image modification may change various pages, blocks or chunks of an image with data from another image that overlays the image, as discussed below with regard to FIG. 4B. Image modification 350 may operate on image data as a stream of data (e.g., a bitstream) so that modifications are applied at the appropriate location in the stream. In this way, the image data can be dynamically changed as it is received, instead of waiting to change the data later or through virtualization management operations which would burden the processor or other host resources to perform that could otherwise be saved if performed by peripheral device 310.

Peripheral device 310 may then store the prepared image data 372 in the appropriate location(s) of host memory 370. In some embodiments, peripheral device 310 may store image data 372 in multiple requests to different memories 370 on a host or via a network request to another peripheral device to another host. In this way, image data that has been retrieved, decompressed, and/or decrypted can be dynamically modified to suit other versions of the image to be deployed at the same or different host without performing all of the same operations to deploy the same (or a version of the same) image (e.g., by eliminating image retrieval decompression, decryption and/or some (or all) of image modification).

Peripheral device 310 may utilize any combination of hardware and/or software to implement image data retrieval 320, image decompression 330, image decryption 340, and image modification 350. For example, dedicated circuitry (e.g., an application specific integrated circuit (ASIC), a field programmable gate array (FPGA), a system-on-chip (SoC)) may be implemented to provide a hardware processing pipeline for getting 322 image data and storing 372 image data to host memory 370. Alternatively a processor executing stored instructions (e.g., firmware) may implement image data retrieval 320, image decompression 330, image decryption 340, and/or image modification 350. Some features, such as image decompression 330 and image decryption 340 may be implemented on dedicated circuitry that optimizes or accelerates decompression and decryption while other features may be implemented by executing stored instructions, in some embodiments.

Figure 4A:
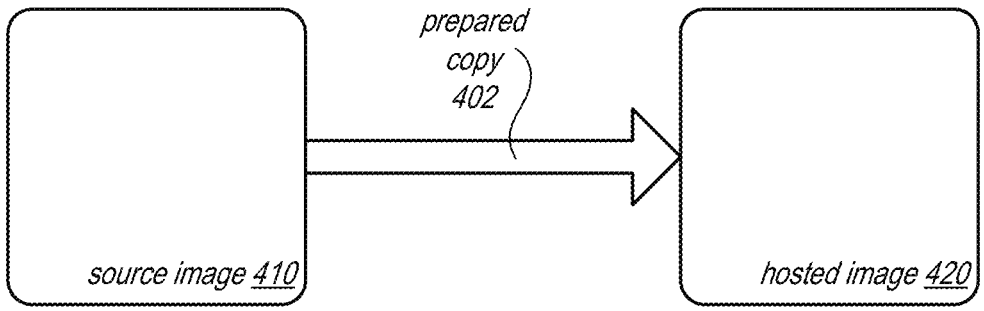
FIGS. 4A-4C illustrate various types of image that may be deployed using a peripheral device, according to some embodiments.
Figure 4B:
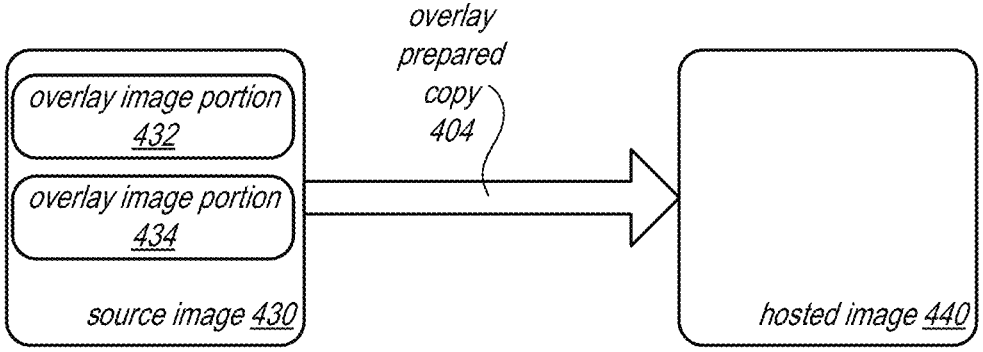

Different types of images can be deployed. For example, as illustrated in FIG. 4A, a source image 410 may be deployed as a prepared copy 402, which may perform the various decryption, decompression, or other modifications (e.g., changing random numbers generated for security purposes) before storing the hosted image 420. In FIG. 4B, however, source image 430 may not be the only information to be included in hosted image 440. An overlay technique may allow for different features of other images (or other applications or sources of data that can be used in an image) to replace corresponding portions of the base image that overlay 404 the prepared copy. In this way, a large source image 430 can be stored along with various smaller overlay portions, such as overlay image portion 432 and 434, which can be applied in different combinations without having to store separate complete images for each version with an overlay applied, saving storage costs and increasing the possible number of images that can be stored (e.g., in local storage for fast deployment).

Figure 4C:
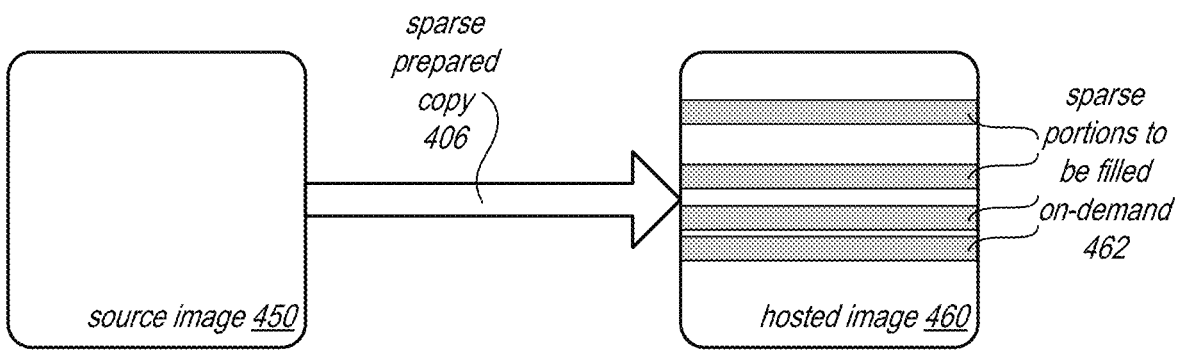

FIG. 4C illustrates another type of image that can be deployed to a host. Instead of copying all of source image 450, only a sparse prepared copy 406 may be stored as hosted image 460. In this way, the sparse portions 462 that were not copied can be filled later as needed or on-demand, saving deployment time and costs be only copying some image data. For example, enough portions of hosted image 460 can be stored to boot, initiate, or otherwise start performance of the computing resource. Then further portions of the image can be stored to the memory in the background while the computing resource is booting or upon demand when such portions of the image are needed to continue operation of the computing resource.

FIG. 5 illustrates interactions between a peripheral device and a virtualization manager of a resource host to manage memory for virtual computing resources, according to some embodiments. Host virtualization management 520, similar to host virtualization management 360 discussed in FIG. 3 above, may utilize a peripheral device 510 (similar to peripheral devices discussed above in FIGS. 1-3) to perform different operations to manage memory for implementing virtual computing resources. For example, host virtualization management 520 may utilize a control interface 502, which may provide various instructions, commands, protocols, or other interfaces for communication with peripheral device 510. For example, control interface 502 may be a version of Non-Volatile Memory express (NVMe) implemented on top of PCIe bus to interact with peripheral device 510 as if it were a merely a storage device, in some embodiments. Custom or overloaded commands, instructions or requests may be implemented in addition to or instead of instructions supported by control interface 502.

As indicated at 540, a request for image data 540 may be specified by host virtualization management 520 to peripheral device 510 via control interface 502. The request may include information to perform an initial preparation and movement of image data to the resource host or may be a request for particular data of an image, which peripheral device 510 may provide on-demand (e.g., in spare filled image scenarios such as those discussed above with regard to FIG. 4C). The request 520 could identify the image data to move by at an offset or other location identification value. In some embodiments, other information, such as which data store and which version of image data may also be specified. The location to which the data is to be written in memory 530 may also be included in the request. For example, an image deployment manifest could be stored in host memory or in other another storage location (e.g., as part of the image) which could provide configuration for the performance of the image deployment (e.g., full, overlay, sparse, boot image and background store remainder image, boot image and store remainder image upon request, etc.). The manifest could provide a map or other set of storage locations for the image in memory which peripheral device 510 can use to determine where to store image data.

As indicated at 550, host virtualization management 520 may also instruct various memory clean up or other memory operations, in some embodiments. For example, clean operations may include operations to overwrite a space in memory with default values to insure that leftover virtual computing resource data private or specific to a particular user account cannot become visible to another virtual computing resource of another user that could be written to that same location.

Peripheral device 510 may utilize Direct Memory Access (DMA) channel 504 in order to access memory 530 without utilizing a processor (including a memory cache for the processor) to write data. DMA channel 504 may be implemented in various ways, such as by leveraging the DMA capabilities of the host interface that connects the peripheral device to the host system (e.g., a PCIe interface). In some embodiments, peripheral device may implement dedicated circuitry or other hardware to manage or implement DMA channel 504, including a dedicated DMA controller (or other management component). Using DMA channel 504, peripheral device 510 can perform various operations in response to control requests received via control interface 502, such as requests to store requested image data 542 in memory 530 or requests to perform cleanup I/O 552.

Figure 6:
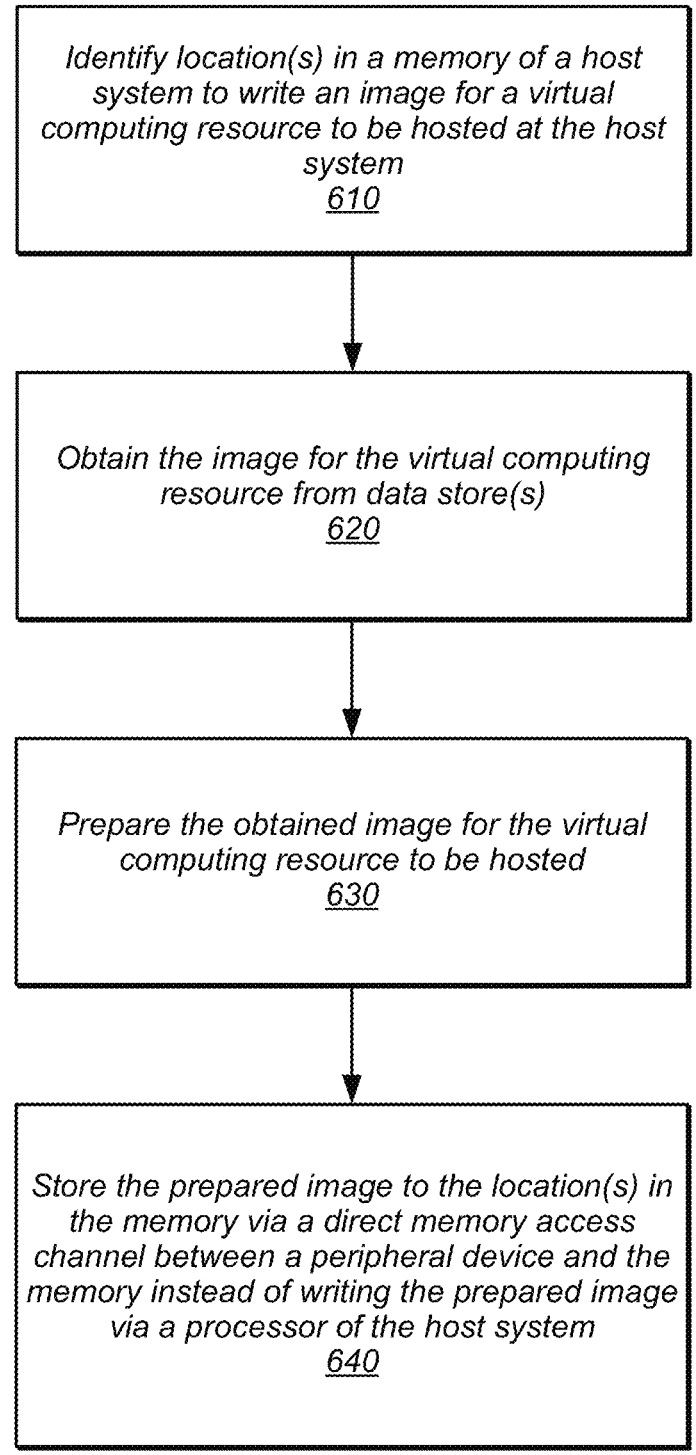
FIG. 6 is a high-level flowchart illustrating various methods and techniques for a peripheral device for accelerating virtual computing resource deployment, according to some embodiments.

The examples of a peripheral device for accelerating virtual computing resource deployment as discussed above with regard to FIGS. 2-5 have been given in regard to a peripheral device implemented at a resource host of a provider network. Various other types or configurations of peripheral devices connected to resource hosts may implement these techniques. FIG. 6 is a high-level flowchart illustrating various methods and techniques for a peripheral device for accelerating virtual computing resource deployment, according to some embodiments. These techniques may be implemented by peripheral network processing devices, as described above with regard to FIGS. 2-5.

As indicated at 610, one or more locations in a memory of a host system to write an image for implementing a virtual computing resource may be identified, according to some embodiments. For example, image data itself (or metadata linked or associated with the image data) may describe a location in a memory, an address or address range, or information that can be used to determine the location in memory, such as an offset or amount of memory for writing the image. In some embodiments, as discussed above with regard to FIG. 3, host virtualization management can send a request to place the image for the computing resource to the peripheral device, which may include the one or more locations in the memory. For example, a virtualization manager for virtual machine images may identify a range of host memory which has been allocated to a virtual machine to be launched on the host. In other embodiments, a virtualization manager for virtualized operating systems (e.g., containers), can generate a memory map to provide various address translation schemes for mapping a container image to the respective locations in the memory to store container image data (as well as coordinating access to the memory locations with various currently executing containers to prevent those containers from reading/overwriting the container image data).

In other embodiments, a control plane or other control system for the host system (and which may be separate from the host system) may specify the locations in the memory. In some embodiments, as discussed above with regard to FIG. 5, a request may be a request for specific image data which may not include all of the image but instead may be an on-demand portion of the image (e.g., which was previously filled with sparse values).

In some embodiments, the various requests described above may indicate which image (e.g., out of multiple possible images that may be accessible) should be written to the memory. An identifier, such as an image name, may be used to lookup the image data at the peripheral device, in some embodiments. A pointer to a file or data object that is the image (or portion thereof) may be provided in a request, in some embodiments. Configuration instructions or other information for preparing the image may also be included in the request, in some embodiments (e.g., which addresses, identifiers, names, or credentials to modify in the image).

As indicated at 620, the image for the virtual computing resource may be obtained from one or more data stores, in some embodiments. For instance, as discussed above, the image can be obtained from local storage devices that are implemented on the peripheral device host system (e.g., local flash-based storage or disk-based storage). Also discussed above are embodiments where remote storage, such as an image (or portion thereof) may be stored in a remote data store (e.g., a remote block-based data store) or network-attached storage which may utilize various network protocols and connections to obtain the image instead of local interfaces. As discussed in FIG. 4B, data from multiple images may be combined, for instance so that some portions of one image are overlaid, overwritten, or otherwise replaced with different data (e.g., from another image or separately stored data—which may not be a complete image). Requests to obtain the image may be as varied as local interfaces like Small Computer System Interface (SCSI) to APIs or other service or storage system-specific interfaces to obtain the image.

As indicated at 630, the obtained image data for the virtual computing resource may be prepared to be hosted, in some embodiments. Different preparations may be performed, as discussed in detail above with regard to FIG. 3 and below with regard to FIG. 7. In some embodiments, preparation may not include any modification to the values of the image data, but may rearrange, split, or otherwise change how the image data is located different from the form in which the image was stored in the data store. In some embodiments, the data may be obtained and written to the storage location without any specified preparation of the image data (although preparation could include the operations to retrieve and store the image data a particular location in the memory.

As indicated at 640, the prepared image may be stored to the location(s) in the memory via a direct memory access channel between a peripheral device and the memory instead of writing the prepared image via a processor of the host system, in some embodiments. For example, different interfaces, protocols, or techniques for providing direct memory access to the memory from the peripheral device, such as direct memory access channels over PCI-based protocols (Peripheral Component Interconnect), to direct memory access components implemented separately from a host system processor, such as a separate DMA engine, that can direct DMA without involving the host system processor. The prepared image may be written in different chunks, sections, addresses, ranges, pages, or portions, in some embodiments. As discussed above with regard to FIG. 3, the prepared image data may be generated in streaming fashion and may consequently be written in streaming fashion to the memory, in some embodiments.

In addition to preparing and storing image data, a peripheral device can perform other operations to manage the hosting of virtual computing resources at a host. For instance, as discussed above with regard to FIG. 5, operations to scrub, clean up, or otherwise prepare memory for hosting future resources may be performed, and thus techniques similar to those discussed above can be applied (e.g., identify the memory locations to operate upon, prepare the data or changes to be made to the identified locations, write or otherwise modify the memory locations using the direct memory access channel).

Figure 7:
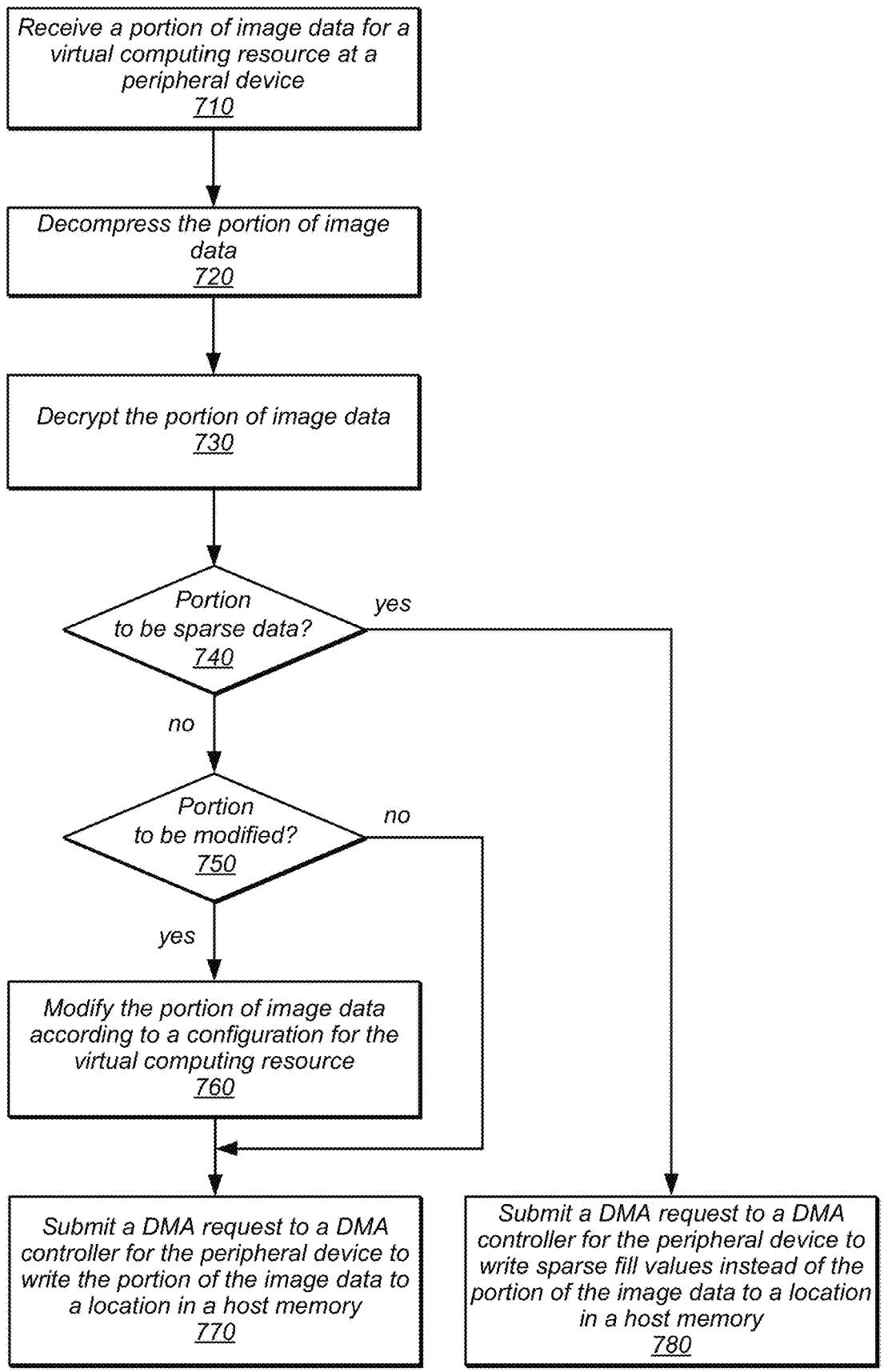
FIG. 7 is a high-level flowchart illustrating various methods and techniques for preparing image data for a virtual computing resource to be hosted by a peripheral device, according to some embodiments.

Different types of computing resources and images for the different types of computing resources may be differently prepared, in some embodiments. Therefore, techniques to prepare obtained images may differ in some cases as well. FIG. 7 is a high-level flowchart illustrating various methods and techniques for preparing image data for a virtual computing resource to be hosted by a peripheral device, according to some embodiments.

As indicated at 710, a portion of image data for a virtual computing resource may be received at a peripheral device, in some embodiments. The portion of image data may be received as a result of read, or other I/O operations performed by the peripheral device to obtain the portion of image data. The portion may be identified responsive to a request for the particular portion (e.g., to provide an on-demand feature to load parts of image data when needed/desired), in some embodiments. As discussed above, the portion may be read in and treated as a stream of data, in some embodiments (e.g., in order to pipeline, stage, or otherwise operate on the data in part instead of as a whole).

As indicated at 720, the portion of the image data may be decompressed, in some embodiments. For example, one (or multiple) lossless compression techniques may have been applied to the portion of image data before it was stored in the data store from which it was received. These compression techniques may be default or standard across all images that may be prepared by the peripheral device so that the compression technique by which to decompress the portion of the image data may be automatically applied. In some embodiments, compression techniques may be selectively applied to different image data so that the compression techniques may be identified (e.g., according to a request to prepare and place the image data or in separate metadata for the image data), in some embodiments. In some scenarios, no decompression may be needed or applied for the portion of the image data.

As indicated at 730, the portion of the image data may be decrypted, in some embodiments. For example, an encryption technique (e.g., symmetric encryption, public-private key encryption, etc.) may have been applied to the portion of image data before it was stored in the data store from which it was received. These encryption techniques may be default or standard across all images that may be prepared by the peripheral device so that the encryption technique by which to decrypt the portion of the image data may be automatically applied. In some embodiments, encryption techniques may be selectively applied to different image data so that the encryption techniques may be identified (e.g., according to a request to prepare and place the image data, such as user or account data that indicates the security credentials or other information to decrypt the portion of the image data), in some embodiments. In some scenarios, no encryption may be needed or applied for the portion of the image data.

As discussed above with regard to FIG. 4C, in some embodiments, a sparse image may be used to place a computing resource. As indicated at 740, a check for the received image data may be performed to determine whether the image data is to be stored or replaced with sparse image data, in some embodiments. For instance, a mapping of memory locations corresponding to portions of image data may identify those portions of the image that need not be copied, but instead may be filled with sparse fill values. In some embodiments, the sparse portions of the data may not be read in from the data store but instead may be skipped when reading image data at 710 (not illustrated). For sparse image data, a DMA request may be submitted to a DMA controller (at the peripheral device or located elsewhere) to store sparse fill values (e.g., a pattern of bit values, such as 1's and 0's) to location in the memory instead of the received portion of the image, as indicated at 780. Alternatively, in some embodiments, a request to deploy image data may identify those portions of image data which are to be sparse so that the image data is not retrieved, decompressed, or decrypted, as discussed above, and may instead be filled with sparse fill values.

As indicated at 750, in some embodiments, the portion of the image data may be modified. For example, modifications may be made to alter or reconfigure the image data to setup a different instantiation of the virtual computing resource from one the image data was previously taken (e.g., a different virtual compute instance than the virtual compute instance that was stored in the image data). Modifications could be detected in streaming fashion (e.g., by identifying a header or other metadata for the image which may indicated a location within the portion of various data values that may be changed (e.g., according to offset values)) on the portion of the data, in some embodiments. In some embodiments, mappings that identify which portions should be modified (and where within those portions) may be included, referenced, or described in a request to prepare and store data to the memory for the virtual computing device.

As indicated at 760, the modification of the image data may be performed to the portion of the image data, in some embodiments. New values may be injected or added, existing values replaced, existing values deleted, or other changes made, including changes to reformat or reformulate the portion of the image data (e.g., to translate numbers from one type of representation to another), in some embodiments. As indicated at 770, a DMA request may be submitted to a DMA controller for a peripheral device to write the portion of the image data to a location in a host memory, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of a peripheral device that accelerates deployment of a virtual computing resource may be executed on a peripheral device connected to one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard (e.g., PCIe) or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor and a memory that implement a host system for virtual computing resources; and
   a peripheral device connected to the host system via a host interface;
   the peripheral device, configured to:
      receive, from the host system, one or more locations in the memory to store an image for implementing a virtual computing resource to be hosted at the host system;
      access one or more storage devices to obtain the image;
      generate a prepared version of the obtained image to be hosted; and store the prepared version of the image to the one or more locations in the memory by one or more direct memory access operations via the host interface instead of by the at least one processor.

2. The system of claim 1, wherein the host system is configured to send a request to the peripheral device to deploy the image of the virtual computing resource to the one or more storage locations in the memory.

3. The system of claim 1, wherein the one or more storage devices are local storage implemented as part of the host system.

4. The system of claim 1, wherein the host system is implemented as part of a virtual compute service of a provider network, wherein the accessed storage devices are implemented as part of a storage service of the provider network, wherein to access the one or more storage devices the peripheral device is configured to send one or more requests to the storage service to obtain the image from the one or more storage devices according to a storage service interface.

5. A method, comprising:
identifying, at a peripheral device connected to a host system, one or more locations in a memory of the host system to store an image for implementing a virtual computing resource to be hosted at the host system;
preparing, by the peripheral device, the image for the virtual computing resource to be hosted; and
storing, by the peripheral device, the prepared image to the one or more locations in the memory via a direct memory access channel between the peripheral device and the memory instead of writing the prepared image via a processor of the host system.

6. The method of claim 5, wherein identifying the one or more locations in the memory of the host system to store the image for implementing the virtual computing resource, comprises receiving a request to deploy the image for the virtual computing resource to the host system received via a control interface from a virtualization manager of the host system.

7. The method of claim 5, wherein preparing the image for the virtual computing resource to be hosted comprises generating a decrypted version of the obtained image according to an encryption technique.

8. The method of claim 5, wherein preparing the image for the virtual computing resource to be hosted, comprises applying one or more overlay portions to the obtained image.

9. The method of claim 5, wherein the prepared image comprises one or more sparse portions, and wherein storing the prepared image comprises storing sparse fill values to corresponding ones of the one or more locations of the memory identified for the one or more sparse portions.

10. The method of claim 9, further comprising storing corresponding other portions of the image to different ones of the one or more locations of the of memory responsive to one or more requests from the host system.

11. The method of claim 5, further comprising performing, by the peripheral device, one or more Input/Output (I/O) operations via the direct memory access channel as part of a cleanup operation performed for a portion of the memory used for a previously hosted virtual computing resource at the host system.

12. The method of claim 5, wherein the image is obtained from a first data store, and wherein at least another portion of the image is obtained from a second data store that is also prepared and stored in the memory.

13. The method of claim 12, wherein the first data store is a remote, network-based data store, and wherein the second data store is a data store implemented at the peripheral device.

14. A peripheral device connected to a host system via a host interface, the peripheral device configured to:
receive one or more locations in a memory of the host system to store an image for implementing a virtual computing resource to be hosted at the host system;
generate a prepared version of the image to be hosted; and
store the prepared version of the image to the one or more locations in the memory by one or more direct memory access operations via the host interface instead of by one or host processor operations.

15. The peripheral device of claim 14, wherein the one or more locations in the memory are received as part of a request to deploy the image for the virtual computing resource to the host system received via a control interface from a virtualization manager of the host system.

16. The peripheral device of claim 14, wherein the prepared version of the image comprises one or more sparse portions, and wherein to store the prepared version of the image, the peripheral device is configured to store sparse fill values to the corresponding portions of the memory for the one or more sparse portions.

17. The peripheral device of claim 14, wherein to generate the prepared version of the image to be hosted, the peripheral device is configured to generate a decompressed version of the read image according to a compression technique.

18. The peripheral device of claim 17, comprising dedicated circuitry to generate the decompressed version of the read image according to the compression technique.

19. The peripheral device of claim 14, comprising a network interface and wherein the peripheral device is further configured to read the image for the virtual computing resource from one or more data stores via one or more requests to read the image sent to the one or more data stores via the network interface.

20. The peripheral device of claim 14, wherein the peripheral device and the host system are implemented as part of an event driven compute service that performs a function using the virtual computing resource responsive to a triggering event for the function.

* * * * *